(12) United States Patent
Stent

(10) Patent No.: US 11,645,511 B2
(45) Date of Patent: May 9, 2023

(54) SYSTEMS AND METHODS FOR SIMULATING INSTANTANEOUS ATTENTIVE HUMAN RESPONSES TO ROAD HAZARDS FOR IMPROVED EARLY WARNING SYSTEMS AND FLEET DATA HARVESTING

(71) Applicant: Toyota Research Institute, Inc., Los Altos, CA (US)

(72) Inventor: Simon A. I. Stent, Cambridge, MA (US)

(73) Assignee: Toyota Research Institute, Inc., Los Altos, CA (US)

(*) Notice: Subject to any disclaimer, the term of this patent is extended or adjusted under 35 U.S.C. 154(b) by 1050 days.

(21) Appl. No.: 16/393,517

(22) Filed: Apr. 24, 2019

(65) Prior Publication Data

US 2020/0342303 A1 Oct. 29, 2020

(51) Int. Cl.
| | | |
|---|---|---|
| G06N 3/08 | (2023.01) | |
| H04N 7/18 | (2006.01) | |
| B60W 50/14 | (2020.01) | |
| G06F 9/54 | (2006.01) | |
| B60W 30/095 | (2012.01) | |
| B60R 21/015 | (2006.01) | |
| B60R 21/013 | (2006.01) | |
| G06V 10/70 | (2022.01) | |

(52) U.S. Cl.
CPC ............ G06N 3/08 (2013.01); B60R 21/013 (2013.01); B60R 21/01538 (2014.10); B60W 30/0956 (2013.01); B60W 50/14 (2013.01); G06F 9/542 (2013.01); G06V 10/70 (2022.01); H04N 7/185 (2013.01); B60W 2420/42 (2013.01); B60W 2540/225 (2020.02)

(58) Field of Classification Search
USPC .................. 340/903, 937, 435, 436; 706/21
See application file for complete search history.

(56) References Cited

U.S. PATENT DOCUMENTS

| | | | | |
|---|---|---|---|---|
| 5,541,590 | A * | 7/1996 | Nishio | B60W 30/09 348/148 |
| 7,565,231 | B2 | 7/2009 | Sherony et al. | |
| 7,613,569 | B2 | 11/2009 | Sherony et al. | |
| 9,165,477 | B2 | 10/2015 | Wilson | |
| 10,072,936 | B2 | 9/2018 | Nagy | |
| 10,994,727 | B1 * | 5/2021 | Kumar | G06Q 30/0213 |
| 2017/0158129 | A1 | 6/2017 | Cosatto | |
| 2019/0375420 | A1 * | 12/2019 | Hou | B60W 50/0097 |
| 2020/0079369 | A1 * | 3/2020 | Kuehnle | B60W 50/16 |
| 2020/0086882 | A1 * | 3/2020 | Kodali | B60W 50/14 |

* cited by examiner

*Primary Examiner* — Brent Swarthout
(74) *Attorney, Agent, or Firm* — Dinsmore & Shohl LLP

(57) ABSTRACT

A system for predicting a hazardous event from road-scene data includes an electronic control unit configured to implement a neural network and a camera communicatively coupled to the electronic control unit, wherein the camera generates the road-scene data. The electronic control unit is configured to receive the road-scene data from the camera, and predict, with the neural network, an occurrence of the hazardous event within the road-scene data from the camera.

18 Claims, 10 Drawing Sheets

SYSTEMS AND METHODS FOR SIMULATING INSTANTANEOUS ATTENTIVE HUMAN RESPONSES TO ROAD HAZARDS FOR IMPROVED EARLY WARNING SYSTEMS AND FLEET DATA HARVESTING

TECHNICAL FIELD

The present specification generally relates to systems and methods for predicting occurrences of a hazardous event in a road-scene. More specifically, the present concept relates to systems and methods for predicting and generating risk-weighted saliency maps from road-scene image or video data utilizing neural networks.

BACKGROUND

Driving environments are dynamic environments. There are many elements such as multiple vehicles, pedestrians, animals or other objects in motion and interacting with each other within the environment. While rules and common sense generally direct the motion and interactions of elements within an environment, random maneuvers or behaviors, inattentive actions, or the like may result in "risky" situations or the potential to cause risk or concern when observed by drivers in the environment. However, drivers may not always be paying attention or be able to process the numerous dynamics in an environment. As such, there is an opportunity to provide systems and methods configured to provide advanced warnings and/or alerts to drivers to focus their attention on potential occurrences of hazardous events in an environment.

SUMMARY

In embodiments, a method for predicting a hazardous event from road-scene data includes providing a neural network, inputting the road-scene data into the neural network, and predicting, with the neural network, an occurrence of the hazardous event.

In some embodiments, a system for predicting a hazardous event from road-scene data includes an electronic control unit configured to implement a neural network and a camera communicatively coupled to the electronic control unit, wherein the camera generates the road-scene data. The electronic control unit is configured to receive the road-scene data from the camera, and predict, with the neural network, an occurrence of the hazardous event within the road-scene data from the camera.

In some embodiments, a vehicle includes an electronic control unit configured to implement a neural network and a camera communicatively coupled to the electronic control unit, wherein the camera generates road-scene data. The electronic control unit is configured to receive the road-scene data from the camera and predict, with the neural network, an occurrence of a hazardous event within the road-scene data from the camera.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
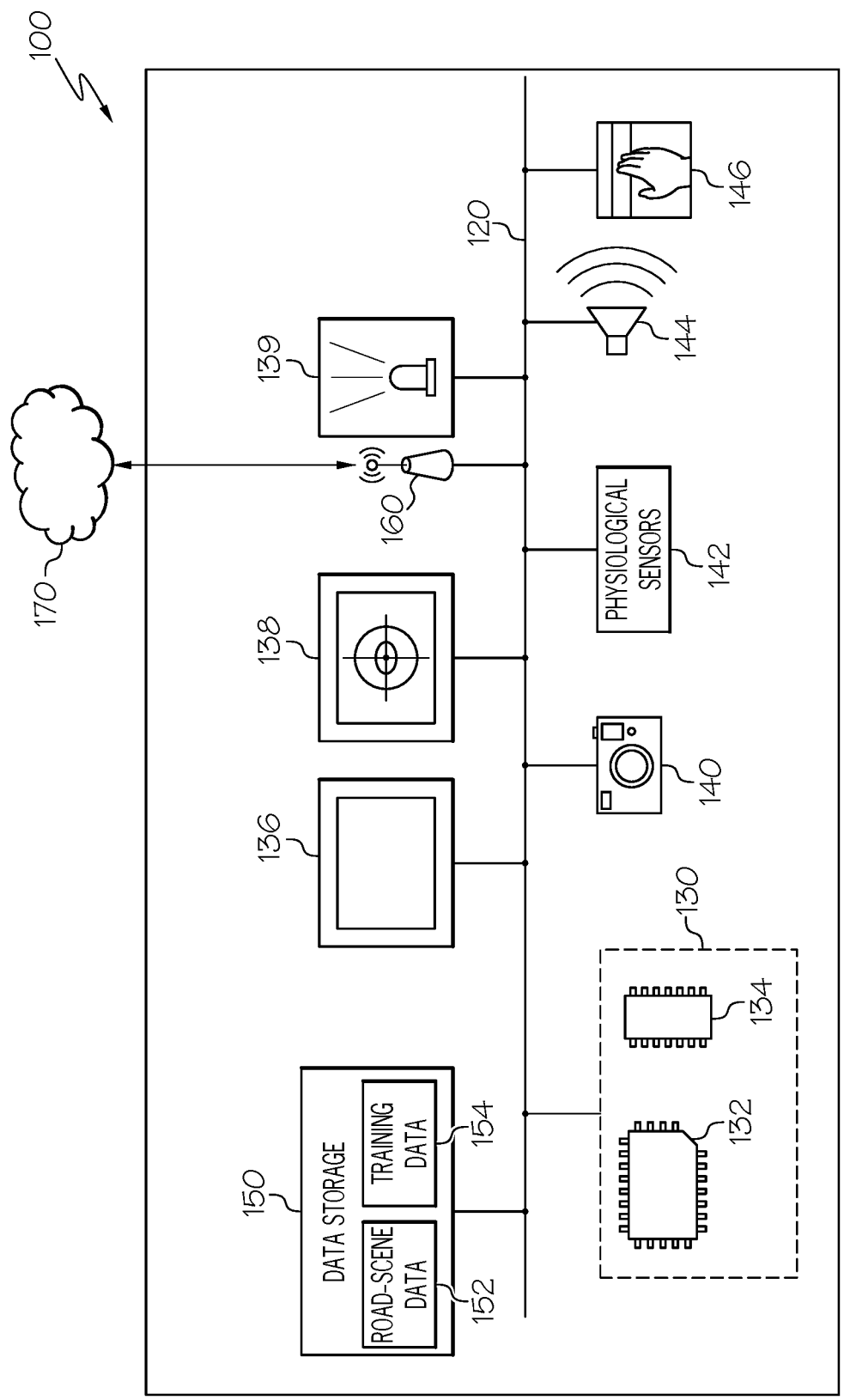
FIG. 1 depicts an illustrative system for predicting occurrences of a hazardous event in a road-scene, according to one or more embodiments shown and described herein.

Embodiments described herein relate to systems and methods for predicting occurrences of a hazardous event in a road-scene. The systems and methods utilize a neural network model trained to predict occurrences of a hazardous event from road-scene data. Embodiments described herein further relate to methods of collecting and preparing training data, training the neural network models and implementing the neural network models. The neural network models may be an artificial neural network, a deep neural network, or another type of neural network.

A neural network approach to predicting occurrences of hazardous events from road-scene data allows a system to learn based on circumstances and previous experiences so that a prediction may be made. These predictions may provide a driver advanced warnings as to the presence or development of a hazardous event. As used herein "hazardous event" refers to an event that requires or may require a vehicle to change speed and/or change direction to avoid unplanned and/or undesired interaction with a source and/or contributor of the event. Sources and/or contributors to hazardous events may include a vehicle, object, animal, individual, or the like that is present in the environment. For example, random maneuvers or behaviors, inattentive actions, or the like may result in "risky" situations or the potential to cause risk or concern when observed by a driver.

Such situations generally provide drivers with less than a normal amount of time to react to the events, and thus rise to the level of a hazardous event. Some examples of hazardous events may include a vehicle backing up from a driveway into a stream of traffic at a rate that is not indicative of the vehicle that is planning to stop and check for clearance before entering the stream of traffic. Another example may include pedestrians detected in a roadway when there is no pedestrian cross-walk present or when a traffic light is green and the walk sign indicates "Do Not Walk." Other hazardous events may be predicted when animals are detected along the shoulder of a road. These are only a few examples of hazardous events that may be learned and predicted by the neural networks disclosed herein.

In some embodiments a neural network learns to predict occurrences of hazardous events from road-scene data which may include road-scene video data of hazardous events along with corresponding gaze-tracking data and/or physiological response data captured from a viewer of the road-scene. In other embodiments, a neural network may be trained using clips (as referred to herein as training data) recorded by vehicle sensors (e.g., a vehicle camera, LIDAR system, or other sensors) before, during, and after a high-G event (e.g., an event indicating a sharp or fast turn and/or fast change in acceleration or braking) or other triggering. In some embodiments, the road-scene data may be harvested from data captured by a fleet of vehicles when there is a detection of high-G events or other triggering events that correspond to hazardous events occurring in an environment of the vehicle. Such road-scene data may be harvested as training data for a neural network as described herein. It is understood that other embodiments may include combinations of elements from either of the described training methods or other methods of training. In general, a trained neural network is capable of predicting a hazardous event, causing the output of an alert or advanced warning, generating a risk-weighted saliency map, identifying road-scenes where clips from one or more vehicle sensors may be configured to capture and record data about the road-scene for use in simulations and other machine learning applications, or the like.

When a trained neural network is implemented, for example, in a vehicle having one or more sensors that generates input data to the neural network, the neural network may enable systems to provide assistance to a driver or even enable autonomous control to maneuver a road-scene in which a hazardous event is predicted. The trained neural network can detect near-miss, risky road-use and other heavily-tailed events. The output of the trained neural network may be used in a real-time feedback loop for providing warning systems to the driver depending on the severity of the estimated hazard signal and its location relative to where the driver is actually looking in the scene, for example, when information about the driver's gaze is obtainable through a driver monitoring system. Furthermore, through the generation of a risk-weighted saliency map a vehicle controller may direct computational resources and/or sensors to focus on risk-weighted salient portions of the road-scene. For example, a directable LIDAR system or high-resolution imaging device may be focused to capture data with respect to the risk-weighted salient portions of the road-scene.

Embodiments of the present disclosure are directed to systems and methods for predicting and generating risk-weighted saliency maps from road-scene image or video data utilizing neural networks. The following will now describe these systems and methods in more detail with reference to the drawings and where like numbers refer to like structures.

Referring now to FIG. 1, a system 100 for predicting occurrences of a hazardous event in a road-scene is depicted. The system 100 may include an electronic control unit 130. The electronic control unit 130 may include a processor 132 and a memory component 134. The system 100 may also include a communication bus 120, a display device 136, a gaze-tracking system 138, an illuminating device 139, one or more cameras 140, one or more physiological sensors 142, a speaker 144, a vehicle display 146, a data storage component 150 and/or network interface hardware 160. The system 100 may be communicatively coupled to a network 170 by way of the network interface hardware 160. The components of the system 100 are communicatively coupled to each other via the communication bus 120.

It is understood that the embodiments depicted and described herein are not limited to the components or configurations depicted and described with respect to FIG. 1, rather FIG. 1 is merely for illustration. The various components of the system 100 and the interaction thereof will be described in detail below.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverses. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors 132, memories, sensors, input devices, output devices, and communication devices. Accordingly, the communication bus 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and the memory component 134. The processor 132 of the system 100 may be any device capable of executing the machine-readable instruction set stored in the memory component 134. Accordingly, the processor 132 may be an electric controller, an integrated circuit, a microchip, a field programmable gate array, a computer, or any other computing device. The processor 132 is communicatively coupled to the other components of the system 100 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 1 includes a single processor 132, other embodiments may include more than one processor 132.

The memory component 134 of the system 100 is coupled to the communication bus 120 and communicatively coupled to the processor 132. The memory component 134 may be a non-transitory computer readable memory and may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as machine language that may be directly executed by the processor 132, or assembly language, object-oriented programming (OOP), scripting languages, microcode, etc., that may be compiled or assembled into machine readable instructions and stored in the memory component 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the system 100 depicted in FIG. 1 includes a single memory component 134, other embodiments may include more than one memory component 134.

Still referring to FIG. 1, the system 100 includes a display device 136 for providing a visual output, for example, to project road-scene video data to a viewer. The display device 136 is coupled to the communication bus 120. Accordingly, the communication bus 120 communicatively couples the display device 136 with other modules of the system 100. The display device 136 may include any medium capable of transmitting an optical output such as, for example, a cathode ray tube, light emitting diodes, a liquid crystal display, a plasma display, or the like. Additionally, the display device 136 may be the display device 136 of a portable personal device such as a smart phone, tablet, laptop or other electronic device. Furthermore, the display device 136 may be a television display mounted on a stand or on a wall to project a road-scene video data to a viewer. Additionally, it is noted that the display device 136 can include one or more processors 132 and one or more memory components 134. While the system 100 includes a display device 136 in the embodiment depicted in FIG. 1, the system 100, may not include a display device 136. That is, a display device 136 may only be used while the system 100 is configured to generate training data, which is described in more detail herein with respect to at least FIGS. 3A-3B.

Figure 3A:
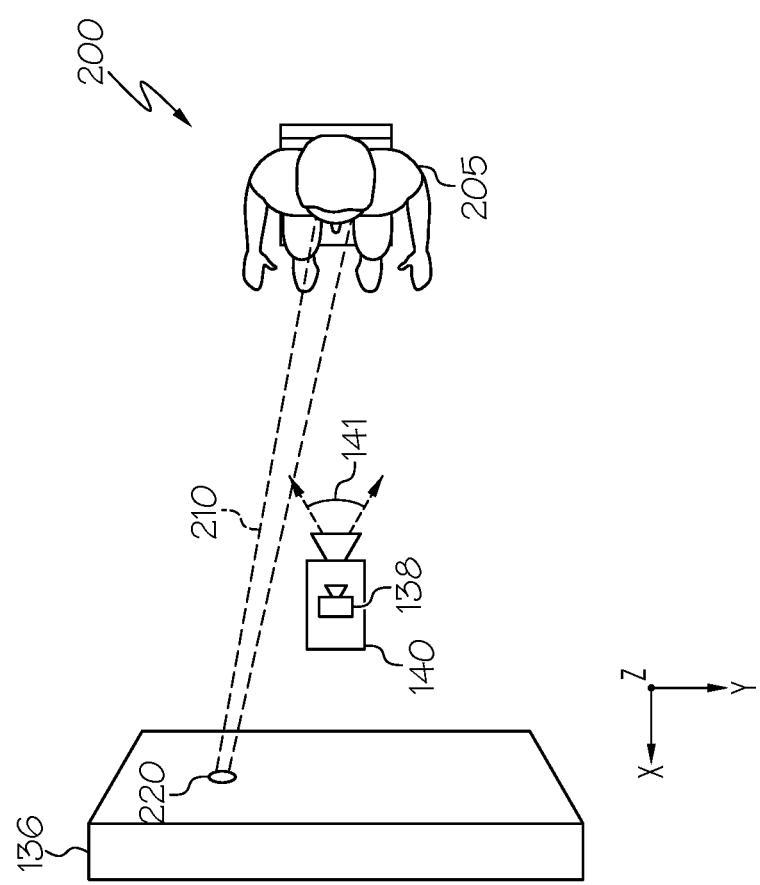
FIG. 3A depicts an illustrative environment for capturing human responses and perceptions to various road-scenes for generating training data for training a neural network, according to one or more embodiments shown and described herein.
Figure 3B:
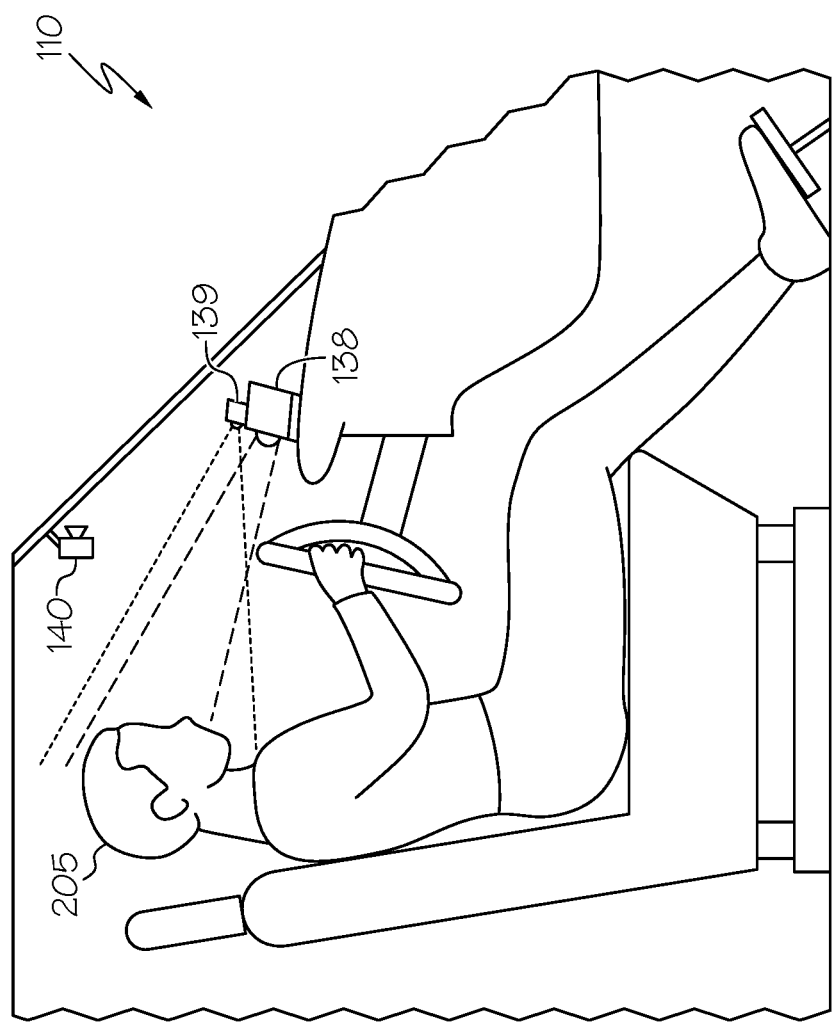
FIG. 3B depicts another illustrative environment for capturing human responses and perceptions to various road-scenes for generating training data for training a neural network, according to one or more embodiments shown and described herein.

The system 100 may include a gaze-tracking system 138 for tracking an eye or gaze direction of a subject to generate a gaze direction vector for determining where a viewer is looking when viewing road-scene video data on a display device (as described in more detail with respect to FIG. 3A) or within a road-scene in the environment of a vehicle (as described in more detail with respect to FIG. 3B). The gaze-tracking system 138 may include one or more cameras 140 and/or an array of infrared light detectors positioned to view one or more eyes of a subject. The gaze-tracking system 138 may also include or be communicatively coupled to an illuminating device 139 which may be an infrared or near-infrared light emitter. The illuminating device 139 may emit infrared or near-infrared light, which may be reflected off a portion of the eye creating a profile that is more readily detectable than visible light reflections off an eye for eye-tracking purposes.

The gaze-tracking system 138 may be spatially oriented in an environment and generate a gaze direction vector. One of a variety of coordinate systems may be implemented such as user coordinate system (UCS) may be used. For example, the UCS has its origin at the center of the front surface of the gaze-tracker. With the origin defined at the center of the front surface (e.g., the eye-tracking camera lens) of the gaze-tracking system 138, the gaze direction vector may be defined with respect to the location of the origin. Furthermore, when spatially orienting the gaze-tracking system 138 in the environment, all other objects including the one or more cameras 140 may be localized with respect to the location of the origin of the gaze-tracking system 138. In some embodiments, an origin of the coordinate system may be defined at a location on the subject, for example, at a spot between the eyes of the subject. Irrespective of the location of the origin for the coordinate system, a calibration process may be employed by the gaze-tracking system 138 to calibrate a coordinate system for collecting gaze-tracking data for training the neural network.

Figure 2:
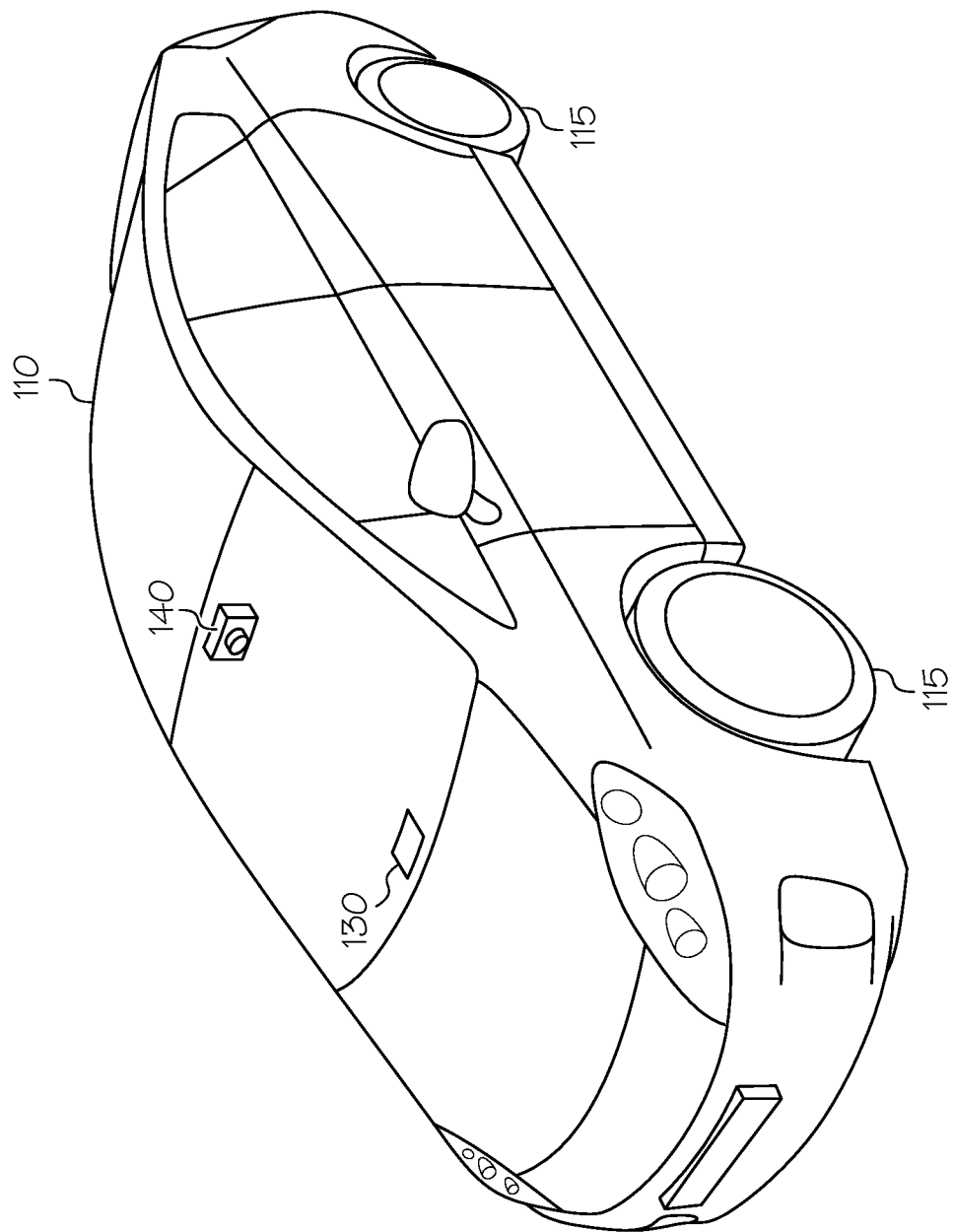
FIG. 2 depicts an illustrative vehicle implemented with the system depicted in FIG. 1, according to one or more embodiments shown and described herein.

Still referring to FIG. 1, the system 100 may include one or more cameras 140. The one or more cameras 140 may be communicatively coupled to the communication bus 120 and to the processor 132. The one or more cameras 140 may be any device having an array of sensing devices (e.g., pixels) capable of detecting radiation in an ultraviolet wavelength band, a visible light wavelength band, or an infrared wavelength band. The one or more cameras 140 may have any resolution. The one or more cameras 140 may be an omni-directional camera, or a panoramic camera, for example. In some embodiments, one or more optical components, such as a mirror, fish-eye lens, or any other type of lens may be optically coupled to each of the one or more cameras 140. In embodiments described herein, the one or more cameras 140 may capture image data or video data of an environment of a vehicle. That is, with reference to FIG. 2, a vehicle 110 having wheels 115 may include one or more cameras 140 mounted thereon. The one or more cameras 140 may be mounted on a dashboard of a vehicle 110, on a rearview mirror, or elsewhere on the vehicle 110 such that the one or more cameras 140 may capture road-scene data of the environment around a vehicle 110. In some embodiments, the vehicle 110 may further include one or more components of the system 100 such as an electronic control unit 130 may be configured with a trained neural network as described herein. That is, the vehicle 110 may receive road-scene data from the camera and predict, with the neural network, an occurrence of a hazardous event within the road-scene data from the camera. In response to predicting an occurrence of a hazardous event within the road-scene data captured by the camera, the electronic control unit 130 may output an alert to the driver warning them of an impending hazardous event so that the driver may take the necessary action to avoid and/or maneuver the vehicle 110. In some instances, the electronic control unit 130 may assume control of the vehicle 110 when a hazardous event is predicted from the road-scene data.

Referring back to FIG. 1, the system 100 further includes one or more physiological sensors 142. The one or more physiological sensors 142 may be communicatively coupled to the communication bus 120 and to the processor 132. The one or more physiological sensors 142 may be any device capable of monitoring and capturing human body responses to the presence of a hazardous event and/or the events leading up to a hazardous event such as sudden changes in an environment. The one or more physiological sensors 142 include sensors configured to measure bodily events such as heart rate change, electrodermal activity (EDA), muscle tension, and cardiac output. In other words, the one or more physiological sensors 142 may monitor brain waves through electroencephalography, EEG, electrodermal activity through a skin conductance response, SCR, and galvanic skin response, GSR, cardiovascular measures such as heart rate, HR; beats per minute, BPM; heart rate variability, HRV; vasomotor activity, muscle activity through electromyography, EMG, changes in pupil diameter with thought and emotion through pupillometry (e.g., pupillometry data), eye movements, recorded via the electro-oculogram, EOG and direction-of-gaze methods, and cardiodynamics recorded via impedance cardiography, or other physiological measures.

The physiological sensors 142 may generate physiological response data that may be utilized to train or evolve a neural network to determine one or more risk-weights for the one or more salient portions within the road-scene data based on the physiological response data associated with the road-scene data. For example, a speed of change, the degree of change, or intensity of the resulting physiological condition such as the speed or amount of pupil dilation or elevation in heart rate may be captured by the one or more physiological sensors 142. The observed changes may be translated into a risk-weight value indicating the severity or level of risk of an event occurring in the road-scene (e.g., through viewing road-scene video data in a controlled environment or in real time while driving). Together the gaze-tracking data and physiological response data may be utilized to generate a risk-weight saliency map of the road-scene. An example of a risk-weight saliency map generated by a trained neural network is further depicted and described with respect to FIG. 9.

Still referring to FIG. 1, the system 100 may also include a speaker 144. The speaker 144 (i.e., an audio output device) is coupled to the communication bus 120 and communicatively coupled to the processor 132. The speaker 144 transforms audio message data as signals from the processor 132 of the electronic control unit 130 into mechanical vibrations producing sound. For example, the speaker 144 may provide to the driver a notification, alert, or warning of an impending hazardous event in the environment of the vehicle. However, it should be understood that, in other embodiments, the system 100 may not include the speaker 144.

The system 100, for example, as implemented in a vehicle 110 (FIG. 2), may include a vehicle display 146. The vehicle display 146 may be a display device 136 as described herein above. The vehicle display 146 may be configured to display an alert or warning message, a risk-weight saliency map, or the like to a driver. The visualization on the vehicle display 146 may assist in bringing one or more portions of an environment to the driver's attention that may correspond to a predicted occurrence of a hazardous event. The vehicle display 146 may also include one or more input devices. The one or more input devices may be any device capable of transforming user contact into a data signal that can be transmitted over the communication bus 120 such as, for example, a button, a switch, a knob, a microphone or the like. In some embodiments, the one or more input devices include a power button, a volume button, an activation button, a scroll button, or the like. The one or more input devices may be provided so that the user may interact with the vehicle display 146, such as to navigate menus, make selections, set preferences, and other functionality described herein. In some embodiments, the input device includes a pressure sensor, a touch-sensitive region, a pressure strip, or the like. It should be understood that some embodiments may not include the input device.

A data storage component 150 that is communicatively coupled to the system 100 may be a volatile and/or non-volatile digital storage component and, as such, may include random access memory (including SRAM, DRAM, and/or other types of random access memory), flash memory, registers, compact discs (CD), digital versatile discs (DVD), and/or other types of storage components. The data storage component 150 may reside local to and/or remote from the system 100 and may be configured to store one or more pieces of data (e.g., road-scene data 152 or training data 154) for access by the system 100 and/or other components. As illustrated in FIG. 1, the data storage component 150 stores, for example, road-scene data 152 that is captured by the one or more cameras 140. The road-scene data 152, as referred to herein, may be road-scene video data or road-scene image data. The road-scene data 152 may be presented to viewers who are monitored by the gaze-tracking system 138 and/or one or more physiological sensors 142 to generate road-scene training data (also referred to herein as training data 154). The data storage component 150 may also store the training data 154.

The system 100 may also include network interface hardware 160 that is communicatively coupled to the electronic control unit 130 via the communication bus 120. The network interface hardware 160 may include any wired or wireless networking hardware, such as a modem, LAN port, Wi-Fi card, WiMax card, mobile communications hardware, and/or other hardware for communicating with a network and/or other devices and systems. For example, the system 100 may be communicatively coupled to a network 170 by way of the network interface hardware 160.

Referring now to FIGS. 3A and 3B, illustrative environments for capturing human responses and perceptions to various road-scenes for generating training data for training a neural network are depicted. FIG. 3A depicts a controlled environment 200 where an individual 205 may be presented with previously captured road-scene data (e.g., in the form of a video or series of images) on a display device 136. A gaze-tracking system 138 and one or more cameras 140 may capture head and eye movements, and/or pupil responses to the presentation of the road-scene data. For example, the size and speed of the change in pupil dilation and/or constriction corresponds to heightened states of alertness which may occur when a hazardous event is developing and/or occurring. The gaze-tracking system 138 may determine a gaze direction vector 210 to determine a salient location 220 within a portion of the road-scene data presented on the display device 136 based on the eye and head position of the individual 205. The road-scene data may be captured from previous driving events. For example, selected road-scene data clips may be recorded by the one or more cameras 140 before, during, and/or after a high-G event or other triggering event as determined by a vehicle system and sensors during a driving event.

FIG. 3B depicts another environment where training data may be developed. In such an embodiment, a vehicle 110 may include one or more cameras 140 positioned to view the road-scene as an individual 205 does while driving the vehicle 110. A gaze-tracking system 138 and optionally an illuminating device 139 may be configured within the vehicle 110 to capture the eye and/or head movements in response to real-time driving events. When a physiological response, for example, through one or more physiological sensors monitoring the individual 205, indicate a response corresponding to a hazardous event, the system may record gaze-direction vectors, physiological response data, and/or road-scene data for training a neural network. In other embodiments, the configuration depicted in FIG. 3B may also be used to provide direct input into a trained neural network, such as the neural network model depicted and described with respect to FIG. 4.

Figure 4:
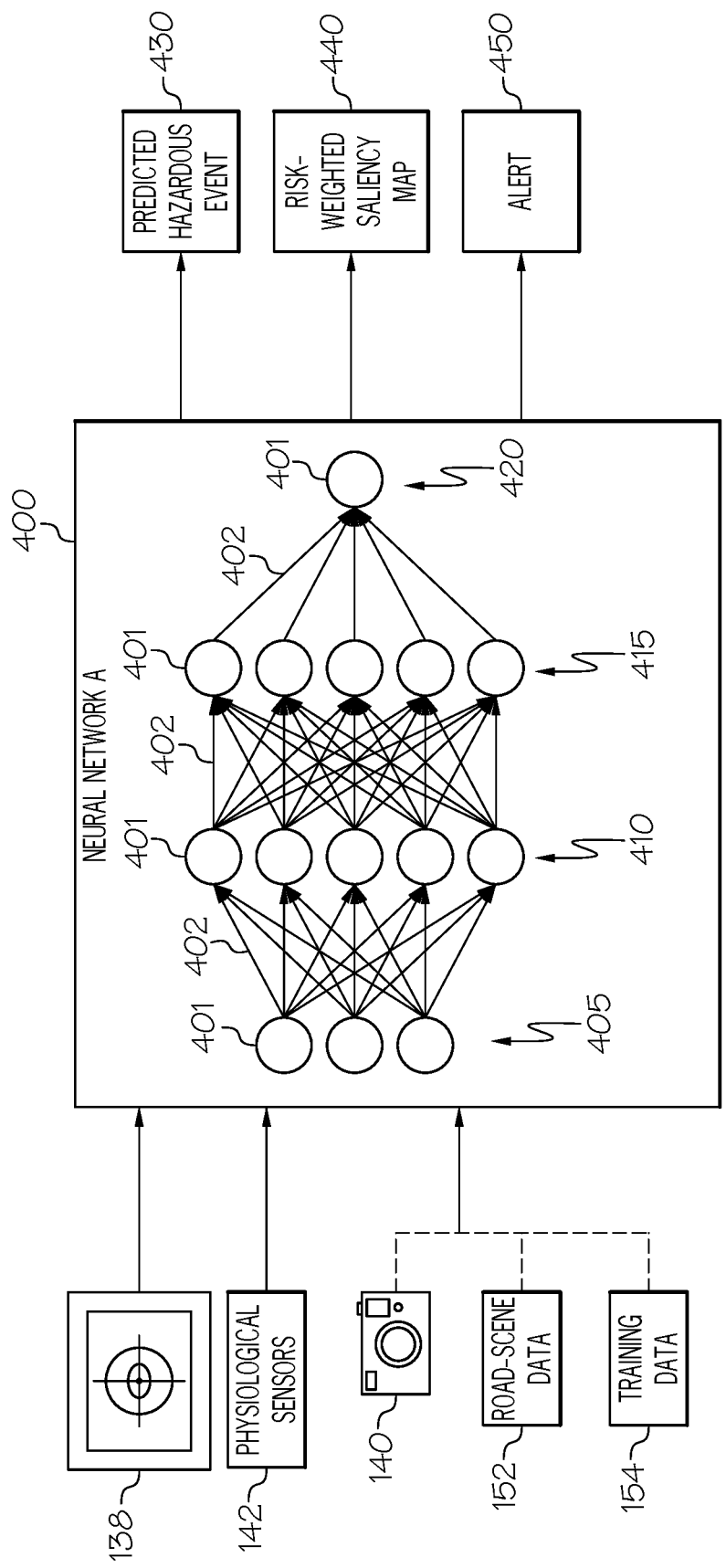
FIG. 4 depicts an illustrative diagram for training a first neural network model, according to one or more embodiments shown and described herein.

Referring now to FIG. 4, an illustrative diagram for training a first neural network 400 and a first neural network 400 is depicted. In some embodiments, the first neural network 400 may include one or more layers 405, 410, 415, 420, having one or more nodes 401, connected by node connections 402. The one or more layers 405, 410, 415, 420 may include an input layer 405, one or more hidden layers 410, 415, and an output layer 420. The input layer 405 represents the raw information that is fed into the first neural network 400. For example, gaze-tracking data from a gaze-tracking system 138, physiological response data from one or more physiological sensors 142, and road-scene data 152 from one or more cameras 140 or previously obtained road-scene data 152 or training data 154 from a data storage component 150 may be input into the first neural network 400 at the input layer 405. The first neural network 400 processes the raw information received at the input layer 405 through nodes 401 and node connections 402. The one or more hidden layers 410, 415, depending on the inputs from the input layer 405 and the weights on the node connections 402, carry out computational activities. In other words, the hidden layers 410, 415 perform computations and transfer information from the input layer 405 to the output layer 420 through their associated nodes 401 and node connections 402.

In general, when a neural network is learning, the neural network is identifying and determining patterns within the raw information received at the input layer 405. In response, one or more parameters, for example, weights associated to node connections 402 between nodes 401, may be adjusted through a process known as back-propagation. It should be understood that there are various processes in which learning may occur, however, two general learning processes include associative mapping and regularity detection. Associative mapping refers to a learning process where a neural network learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge which is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0) and 2) adaptive networks which are able to change their weights (i.e., dW/dt not=0). In fixed networks, the weights are fixed a priori according to the problem to solve.

In order to train a neural network to perform some task, adjustments to the weights are made in such a way that the error between the desired output and the actual output is reduced. This process may require that the neural network computes the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network, hence "back propagation". Once the EA has been computed for a unit, it is straight forward to compute the EW for each incoming connection of the unit. The EW is the product of the EA and the activity through the incoming connection. It should be understood that this is only one method in which a neural network is trained to perform a task.

Referring back to FIG. 4, the first neural network 400 may include one or more hidden layers 410, 415 that feed into one or more nodes 401 of an output layer 420. There may be one or more output layers 420 depending on the particular output the neural network is configured to generate. For example, the first neural network 400 may be trained to output predictions of hazardous events 430, generate a risk-weighted saliency map 440, output an alert 450 relating to the occurrence or predicted occurrence of a hazardous event, and/or the like.

Figure 5:
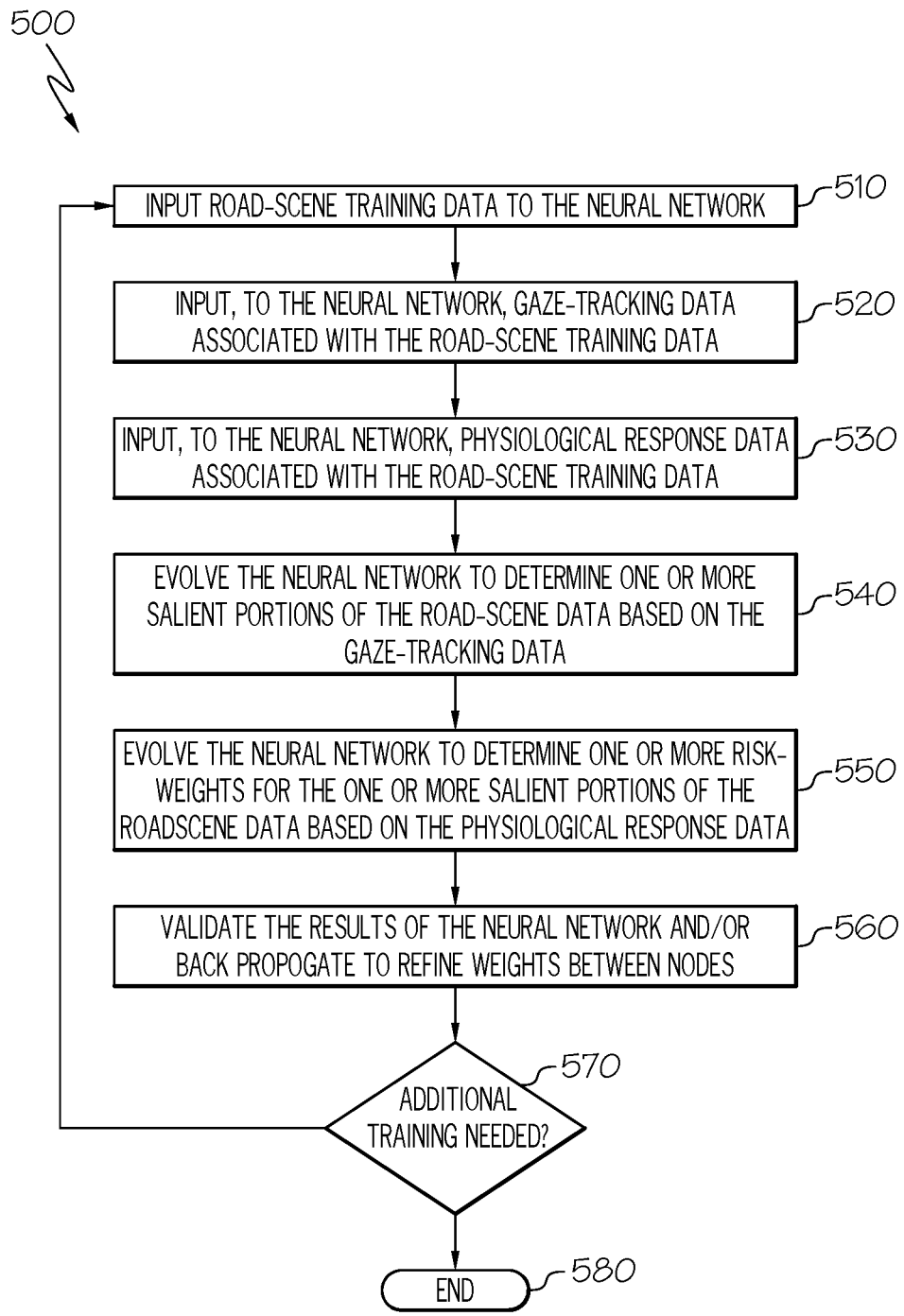
FIG. 5 depicts an illustrative flow diagram for training the first neural network model, according to one or more embodiments shown and described herein.

Turning to FIG. 5, an example flow diagram 500 of a method of training the first neural network 400 of FIG. 4 is depicted. Flow diagram 500 is only one method in which a neural network, for example the first neural network 400, may be trained. It should be understood that the training inputs which a neural network receives should correspond to the inputs the neural network would receive when implemented after it is trained. For example, the first neural network 400, as depicted in FIG. 4, includes at least three types of inputs: gaze-tracking data, physiological data, and road-scene data 152. As such, when training the first neural network 400, at block 510, road-scene training data is input to the first neural network 400. The road-scene training data may include road-scene video or image data stored from previous driving events, road-scene data 152 captured in real-time from a vehicle mounted camera, or training data harvested from controlled presentations of road-scene videos to an individual 205 such as in an environment depicted and described with respect to FIG. 3A. At block 520, gaze-tracking data that is associated with the road-scene data 152 is input to the first neural network 400. At block 530, physiological response data that is associated with the road-scene data 152 is input to the first neural network 400. The first neural network 400 is evolved to determine one or more salient portions within the road-scene data 152 based on the gaze-tracking data at block 540. That is, one or more parameters, such as node connection weights, may be adjusted through a method such as back propagation within the one or more hidden layers 410, 415 of the first neural network 400. At block 550, the first neural network 400 is evolved to determine one or more risk-weights for the one or more salient portions of the road-scene data 152 based on the physiological response data.

At block 560, back propagation may be implemented to refine the weights of the node connections to further train the neural network to predict an occurrence of a hazardous event, generate a risk-weighted saliency map, and/or output an alert in response to predicting the occurrence of a hazardous event. At block 570, the method may determine whether additional training of the first neural network 400 is needed. The determination may be based on whether there is additional training data available, whether the first neural network 400 is producing accurate predictions and/or risk-weighted saliency maps or other factors that indicate the first neural network 400 is trained. If additional training is needed the method returns to block 510. The road-scene data 152 input during the first iteration of training is different from the second iteration and subsequent iterations of training. Otherwise, the method may end at block 580.

Figure 6:
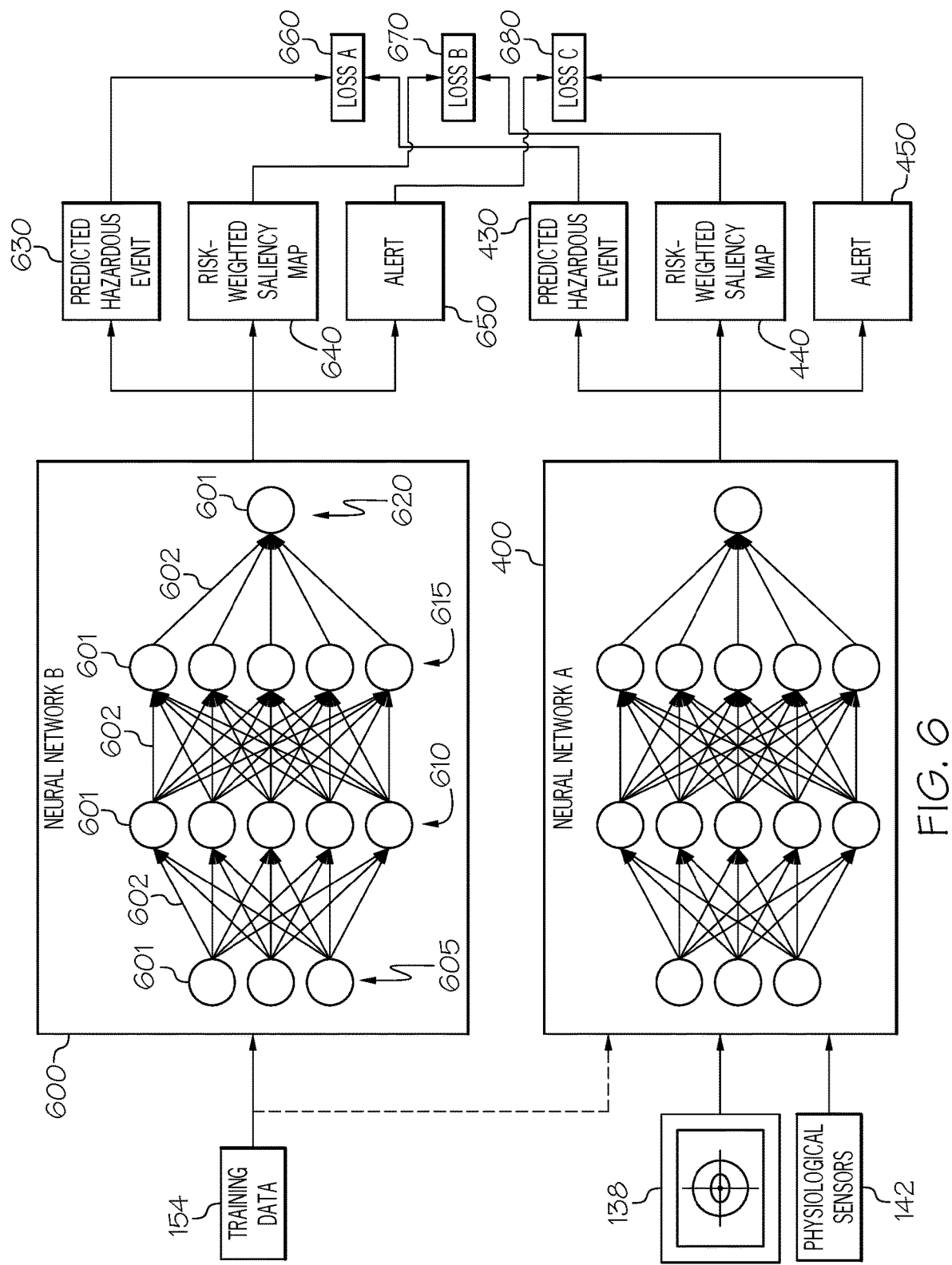
FIG. 6 depicts an illustrative diagram for training a second neural network model, according to one or more embodiments shown and described herein.

Referring now to FIG. 6, another illustrative diagram for training a neural network model, a second neural network 600, is depicted. Unlike the first neural network 400, the second neural network 600 is trained based on only training data 154 (i.e., road-scene data 152 that includes clips of a road-scene just before, during and/or after the occurrence of a hazardous event in the environment of a vehicle). In some embodiments, the second neural network 600 may be trained solely on the training data 154 to generate one or more outputs including for example a prediction of an occurrence of a hazardous event, generation of a risk-weighted saliency map, and/or generation of an output of an alert 650 in response to a prediction of an occurrence of a hazardous event. However, in some embodiments, training of the second neural network 600 may be supervised by validating the outputs of the second neural network 600 with the outputs of a trained first neural network 400. In such an instance, loss values (e.g., loss A 660, loss B 670 and loss C 680) may be computed and utilized to update one or more parameters of the second neural network 600 during training.

Similar to the first neural network 400 described with respect to FIG. 4, the second neural network 600 may include one or more nodes 601 and connection nodes 602 forming one or more layers 605, 610, 615, 620. An input layer 605 may receive raw information from the training data 154. Furthermore, the second neural network 600 may be a deep temporal neural network having more than one hidden layer 610, 615. Finally, although FIG. 6 only depicts one node 601 in the output layer 620 and only one output layer 620, it is understood that this is only an example and the second neural network 600 (as well as the first neural network 400) may include multiple nodes 601 within the output layer 620 and/or multiple output layers 620.

In embodiments where training of the second neural network 600 is supervised by the outputs of the trained first neural network 400, the trained first neural network 400 receives the training data 154, gaze-detection data from a gaze-tracking system 138, and physiological response data from one or more physiological sensors 142 as inputs to generate the one or more outputs (e.g., predicted hazardous event 430, risk-weighted saliency map 440, and/or an alert 450). The trained first neural network 400 may provide the second neural network 600 with the known or expected outputs (i.e., labeled data) for which one or more loss values may be determined. For example, loss A 660 may be determined based on the difference between the predicted hazardous event 430 output by the first neural network 400 and the predicted hazardous event 630 output by the second neural network 600. Loss B 670 may be determined based on the difference between the risk-weighted saliency map 440 output by the first neural network 400 and the risk-weighted saliency map 640 output by the second neural network 600. Loss C 680 may be determined based on the difference between the alert 450 output by the first neural network 400 and the alert 450 output by the second neural network 600.

When training is performed, initially all the weights of the second neural network 600 are randomly assigned. For every input in the training data, the second neural network 600 is activated and its output is observed. This output is compared with the desired output (e.g., from the trained first neural network 400), and the error is "propagated" back to the previous one or more layers of the second neural network 600. This error is noted and the weights are "adjusted" accordingly. This process may be repeated until the output error (i.e., the loss values 660, 670, 680) is below a predetermined threshold.

Figure 7:
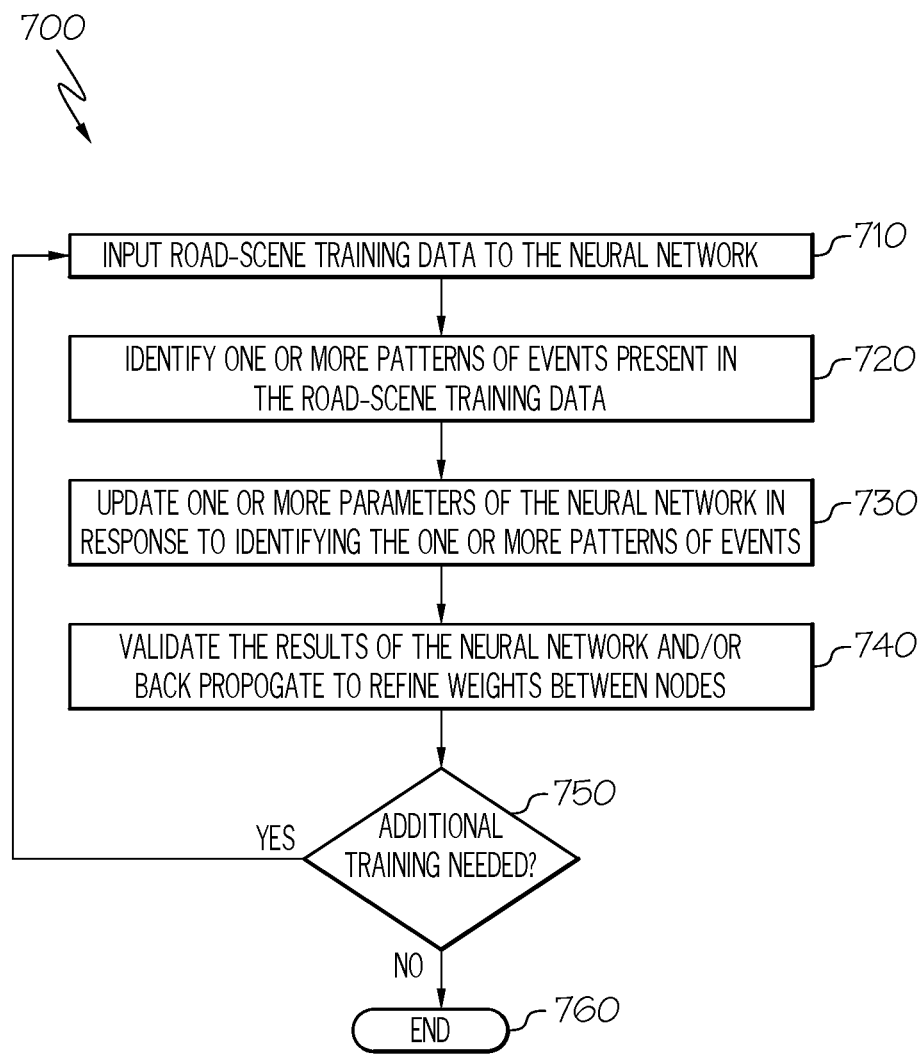
FIG. 7 depicts an illustrative flow diagram for training the second neural network model, according to one or more embodiments shown and described herein.

Referring now to FIG. 7, an example flow diagram 700 of a method of training the second neural network 600 of FIG. 6 is depicted. Flow diagram 700 is only one method in which a neural network, for example the second neural network 600, may be trained. It should be understood that the training inputs which a neural network receives should correspond to the inputs the neural network would receive when implemented after it is trained. For example, the second neural network 600, as depicted in FIG. 6, includes just an input of training data (i.e., road-scene video data). Training the second neural network 600 includes inputting road-scene training data to the neural network at block 710. The road-scene training data includes at least one sequence of an example hazardous event occurring in a road-scene. At block 720, the neural network may identify one or more patterns of events present in the road-scene training data and in response, at block 730, update one or more parameters of the neural network.

The results of the neural network may be validated against known or expected results provided by a labeled dataset or from an output of a trained first neural network 400 at block 740. Moreover, at block 740, back propagation may be implemented to refine the weights of the node connections to further train the neural network to predict an occurrence of a hazardous event, generate a risk-weighted saliency map, and/or output an alert in response to predicting the occurrence of a hazardous event. At block 750, the method may determine whether additional training of the second neural network 600 is needed. The determination may be based on whether there is additional training data available, whether the second neural network 600 is producing accurate predictions and/or risk-weighted saliency maps or other factors that indicate the second neural network 600 is trained. If additional training is needed the method returns to block 710. The road-scene data input during the first iteration of training is different from the second iteration and subsequent iterations of training. Otherwise, the method may end at block 760.

Figure 8:
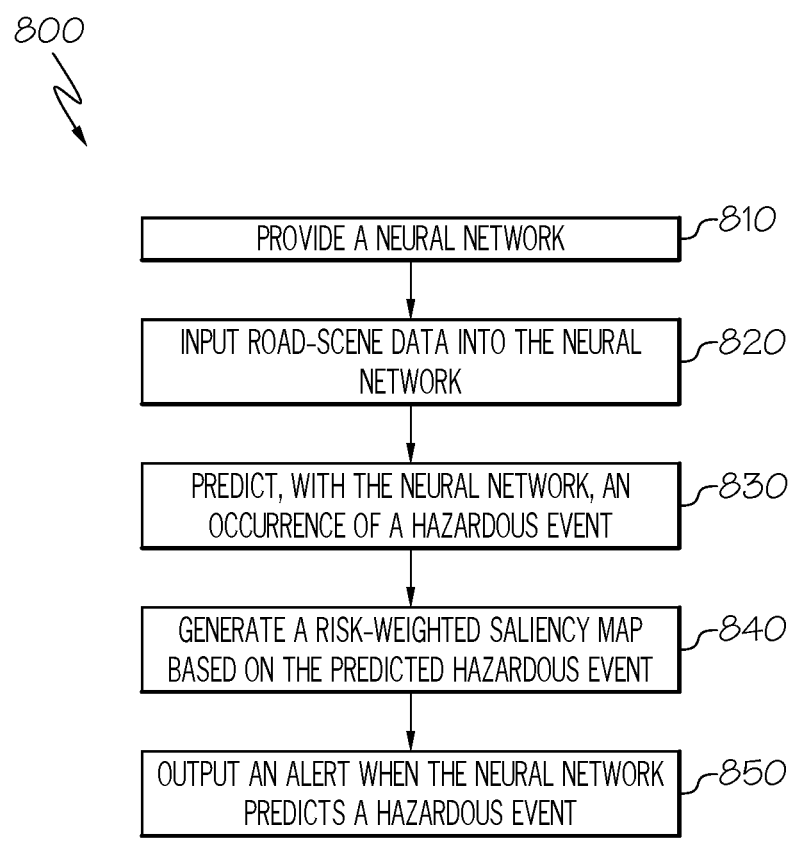
FIG. 8 depicts an illustrative flow diagram for occurrences of a hazardous event in a road-scene, according to one or more embodiments shown and described herein.

Turning now to FIG. 8 a flow diagram 800 is illustrated depicting an example method of implementing a trained neural network to predict an occurrence of a hazardous event from road-scene data, generating a risk-weight saliency map, and/or output an alert based on the predicted hazardous event. The neural network may be implemented in an electronic control unit. That is, at block 810 a neural network may be provided to and/or implemented within a system.

The electronic control unit may receive an input from a camera which provides road-scene data to the neural network for processing, at block 820. At block 830, the neural network may process the road-scene data and predict an occurrence of a hazardous event if one is present in the road-scene data. At block 840, the neural network may process the road-scene data to generate a risk-weighted saliency map. At block 850, the neural network may process the road-scene data and generate an alert if a hazardous event is predicted. The alert may be auditory, visual, tactile, or a combination thereof. The alert may be a graded alert to the driver based on the level of likelihood or imminence of the predicted hazardous event to the subject vehicle. In some embodiments, the alert may be more intense when a gaze-detection system determines the driver is not aware of the road-scene and less intense when the driver is determined to be focused on the salient features of the hazardous event (i.e., presumed to be aware and alert to their surroundings). That is, the driver may be looking away from where the hazardous event is developing or occurring. In some embodiments, the alert may be a visual alert projected on a heads-up display of the vehicle which highlights the location of the hazardous event in the road-scene to the driver. It is understood that these are only a few examples of alerts that may be provided to a driver, other types of alerts or factors may be included in determining the intensity or type of alert that is output to the driver.

Figure 9:
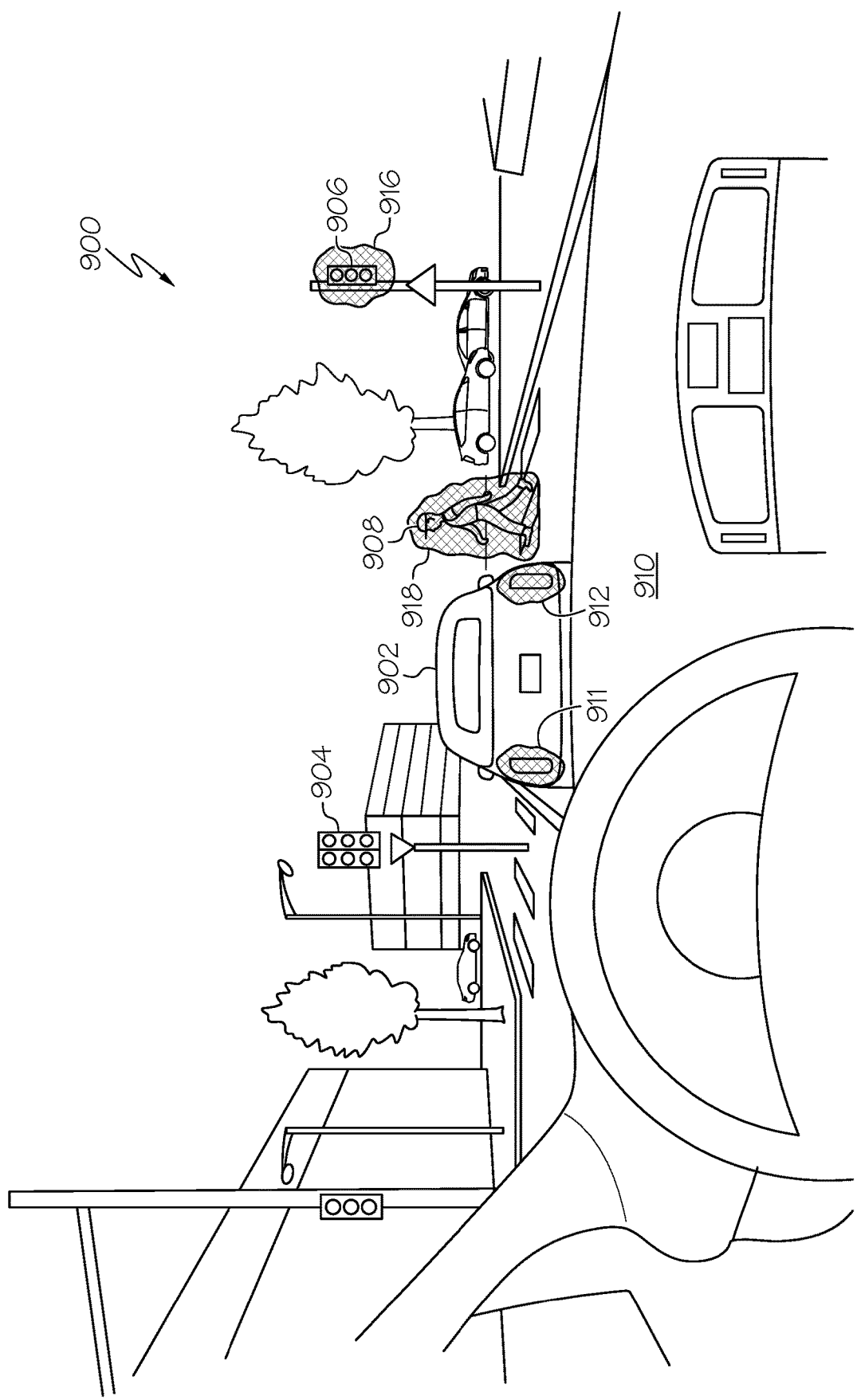
FIG. 9 depicts an illustrative risk-weighted saliency map generated by one or more neural network models, according to one or more embodiments shown and described herein.

Referring now to FIG. 9, an illustrative risk-weighted saliency map 900 generated by a neural network model is depicted. As discussed above, the neural network for predicting an occurrence of a hazardous event may generate a saliency map and/or risk-weight saliency map based on the inputs received. FIG. 9 depicts a frame of a road-scene video data having multiple salient portions highlighted in response to the neural networks processing of the road-scene data and/or gaze-tracking data and physiological response data. For example, the road-scene depicted in FIG. 9 includes a view from a vehicle 910 of a second vehicle 902, stoplights 904, 906, a pedestrian 908 and multiple highlights 911, 912, 916 and 918 indicating salient portions of the road-scene. The highlights 911, 912, 916, 918 may include outlines of portions of the road-scene determined to be salient to a predicted hazardous event and/or locations where a driver's gaze has focused leading up to and during the predicted hazardous event. The highlights 911, 912, 916, 918 may form a heat map indicating the level or degree of physiological response detected from the driver when viewing the portion of the road-scene during the predicted hazardous event. In some embodiments, the highlights 911, 912, 916, 918 may be a prediction of salient locations within the road-scene which are causing or contributing to the hazardous event. For example, the stoplight 906 may indicate a green light for vehicles to "GO" but a pedestrian 908 may still be present in the roadway. As such, the pedestrian 908 and the stoplight 906 are salient elements to predicting the occurrence of a hazardous event, that is, if traffic were to start moving then the pedestrian 908 is at risk of being hit by one of the vehicles 902, 910. By way of another example, vehicle 902 may have their brake lights illuminated because a pedestrian 908 suddenly entered the roadway. Therefore, the brake light portions 911, 912 of the second vehicle 902 and the pedestrian salient locations within the road-scene are highlighted as salient because they are related to portions of the road-scene a driver is or needs to be aware of as the hazardous event of suddenly stopping to avoid hitting the second vehicle 902 and/or the pedestrian 908 develops and occurs.

In response to predicting the occurrence of a hazardous event, the system may generate a risk-weight saliency map that may be utilized by one or more other vehicle systems to provide navigation and or maneuvering functionality to the driver or an autonomous system. In some embodiments, an alert is generated so that the driver may be made aware of a potential and/or impending hazardous event. In some instances, an autonomous function may be implemented to automatically maneuver the vehicle through and/or around a hazardous event in the road-scene.

It should be understood that the embodiments described herein are directed to systems and methods for predicting occurrences of a hazardous event in a road-scene. In embodiments, the systems and methods utilize a neural network model trained to predict occurrences of a hazardous event from road-scene data. Some embodiments include methods of collecting and preparing training data, training the neural network models and implementing the neural network models. In general, methods include providing a neural network, inputting road-scene data into the neural network, and predicting, with the neural network, an occurrence of a hazardous event. The neural networks may be trained in a variety of ways with a variety of data inputs. The selection of such data inputs for training may correspond to the ultimate or desired implementation of the neural network. That is, the neural network may be trained using data that will be available to the network when the trained neural network is implemented within a system or vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for predicting a hazardous event from road-scene data, the method comprising:
   providing a neural network;
   inputting the road-scene data, gaze-tracking data, and physiological data into the neural network, the neural network is trained with training gaze-tracking data and training physiological data associated with road-scene training data;
   predicting, with the neural network, an occurrence of the hazardous event;
   determining, with the neural network, one or more salient portions of the predicted hazardous event and one or more risk-weights for the one or more salient portions based on the gaze-tracking data and the physiological data; and
   outputting a graded alert corresponding to the one or more risk-weights and the predicted hazardous event.

2. The method of claim 1, wherein the neural network is trained by:

a) inputting the road-scene training data to the neural network, wherein the road-scene training data includes at least one sequence of an example hazardous event occurring in a road-scene;
b) identifying, with the neural network, one or more patterns of events present in the at least one sequence of the example hazardous event within the road-scene training data;
c) updating one or more parameters of the neural network in response to identifying the one or more patterns of events; and
d) repeating steps a-c one or more times, wherein the road-scene training data input during a first iteration of training of the neural network is different than a second iteration of training of the neural network.

3. The method of claim 2, wherein the road-scene training data includes road-scene video data captured by a camera attached to a vehicle during a high-G event.

4. The method of claim 1, wherein the neural network is trained by:
a) inputting the road-scene training data to the neural network;
b) inputting the training gaze-tracking data associated with the road-scene training data into the neural network;
c) inputting the training physiological response data associated with the road-scene training data into the neural network;
d) evolving the neural network to determine one or more salient portions within the road-scene data based on the training gaze-tracking data;
e) evolving the neural network to determine one or more risk-weights for the one or more salient portions within the road-scene data based on the training physiological response data associated with the road-scene data; and
f) repeating steps a-e one or more times, wherein the road-scene training data input during a first iteration of training of the neural network is different than a second iteration of training of the neural network.

5. The method of claim 4, wherein the training physiological response data includes pupillometry data.

6. The method of claim 4, wherein the training gaze-tracking data and the training physiological response data is generated from sensor systems configured to monitor responses of one or more individuals to the road-scene training data.

7. The method of claim 1, further comprising generating a risk-weighted saliency map based on the predicted hazardous event.

8. The method of claim 1, further comprising outputting an alert when the neural network predicts the occurrence of the hazardous event present in the road-scene data.

9. The method of claim 8, wherein the alert is a graded alert corresponding to a degree of the predicted hazardous event.

10. The method of claim 1, wherein the road-scene data includes road-scene video data.

11. The method of claim 1, wherein the neural network is trained to identify one or more patterns preceding the hazardous event.

12. A system for predicting a hazardous event from road-scene data comprising:
an electronic control unit configured to implement a neural network; and
a camera communicatively coupled to the electronic control unit, wherein the camera generates the road-scene data, and wherein the electronic control unit is configured to:
receive the road-scene data from the camera;
input the road-scene data, gaze-tracking data, and physiological data into the neural network, the neural network is trained with training gaze-tracking data and training physiological data associated with road-scene training data;
predict, with the neural network, an occurrence of the hazardous event within the road-scene data from the camera;
determine, with the neural network, one or more salient portions of the predicted hazardous event and one or more risk-weights for the one or more salient portions based on the gaze-tracking data and the physiological data; and
output a graded alert corresponding to the one or more risk-weights and the predicted hazardous event.

13. The system of claim 12, wherein the electronic control unit is further configured to:
generate, with the neural network, a risk-weighted saliency map based on the road-scene data.

14. The system of claim 12, wherein the graded alert corresponds to a degree of the predicted hazardous event.

15. The system of claim 12, wherein the neural network is trained to identify one or more patterns preceding the hazardous event.

16. The system of claim 12, wherein the neural network is trained by the steps:
a) inputting the road-scene training data to the neural network, wherein the road-scene training data includes at least one sequence of an example hazardous event occurring in a road-scene;
b) identifying, with the neural network, one or more patterns of events present in the at least one sequence of the example hazardous event within the road-scene training data;
c) updating one or more parameters of the neural network in response to identifying the one or more patterns of events; and
d) repeating steps a-c one or more times, wherein the road-scene training data input during a first iteration of training of the neural network is different than a second iteration of training of the neural network.

17. The system of claim 12, wherein the neural network is trained by:
a) inputting the road-scene training data to the neural network;
b) inputting the training gaze-tracking data associated with the road-scene training data into the neural network;
c) inputting the training physiological response data associated with the road-scene training data into the neural network;
d) evolving the neural network to determine one or more salient portions within the road-scene data based on the training gaze-tracking data;
e) evolving the neural network to determine one or more risk-weights for the one or more salient portions within the road-scene data based on the training physiological response data associated with the road-scene data; and
f) repeating steps a-e one or more times, wherein the road-scene training data input during a first iteration of training of the neural network is different than a second iteration of training of the neural network.

18. A vehicle comprising:

an electronic control unit configured to implement a neural network; and a camera communicatively coupled to the electronic control unit, wherein the camera generates road-scene data, and wherein the electronic control unit is configured to:

receive the road-scene data from the camera;

input the road-scene data, gaze-tracking data, and physiological data into the neural network, the neural network is trained with training gaze-tracking data and training physiological data associated with road-scene training data;

predict, with the neural network, an occurrence of a hazardous event within the road-scene data from the camera;

determine, with the neural network, one or more salient portions of the predicted hazardous event and one or more risk-weights for the one or more salient portions based on the gaze-tracking data and the physiological data; and output a graded alert corresponding to the one or more risk-weights and the predicted hazardous event.

* * * * *